United States Patent
Arimatsu (10) Patent No.: US 11,480,938 B2
(45) Date of Patent: Oct. 25, 2022

(54) CONTROL DEVICE, MACHINING SYSTEM, AND RECORDING MEDIUM ENCODED WITH PROGRAM

(71) Applicant: FANUC CORPORATION, Yamanashi (JP)

(72) Inventor: Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/102,844

(22) Filed: Nov. 24, 2020

(65) Prior Publication Data

US 2021/0191358 A1 Jun. 24, 2021

(30) Foreign Application Priority Data

Dec. 23, 2019 (JP) .............................. JP2019-231924

(51) Int. Cl.
*G05B 19/404* (2006.01)
*B23Q 15/12* (2006.01)

(52) U.S. Cl.
CPC ........... *G05B 19/404* (2013.01); *B23Q 15/12* (2013.01); *G05B 2219/49313* (2013.01)

(58) Field of Classification Search
None
See application file for complete search history.

(56) References Cited

U.S. PATENT DOCUMENTS

| 4,817,003 A * | 3/1989 | Nagase ................. B24B 41/042 700/164 |
| 2006/0018725 A1* | 1/2006 | Ichino ..................... F16F 15/22 409/131 |
| 2021/0046600 A1* | 2/2021 | Yauchi ................. G05B 19/404 |

FOREIGN PATENT DOCUMENTS

| JP | H05-145651 A | 6/1993 |
| JP | 2899673 B2 * | 6/1999 |

OTHER PUBLICATIONS

Machine Translation of JP-2899673-B2 (Year: 1999).*

* cited by examiner

*Primary Examiner* — Ryan A Jarrett
(74) *Attorney, Agent, or Firm* — Studebaker & Brackett PC (57) ABSTRACT

A control device is configured to control operation of a drive unit and monitor a rotational balance of a rotating body, for a machine tool including the rotating body that is rotatable around a predetermined axial center in a state of fixing a workpiece and on which an adjusting tool that can adjust the rotational balance is arrangeable, and the drive unit that rotates the rotating body, and the control device includes: a physical quantity acquiring unit configured to acquire at least one physical quantity indicating a rotational state of the rotating body, the physical quantity being changed in response to an adjustment of the rotational balance; a comparing unit configured to compare a plurality of physical quantities having different acquisition times; and an output unit configured to output a comparison result.

7 Claims, 9 Drawing Sheets

CONTROL DEVICE, MACHINING SYSTEM, AND RECORDING MEDIUM ENCODED WITH PROGRAM

This application is based on and claims the benefit of priority from Japanese Patent Application No. 2019-231924, filed on 23 Dec. 2019, the content of which is incorporated herein by reference.

BACKGROUND OF THE INVENTION

Field of the Invention

The present disclosure relates to a control device, a machining system, and a recording medium encoded with a program.

Related Art

Conventionally, a machine tool for machining a workpiece by fixing the workpiece to a rotating body has been known. In such a machine tool, the center of gravity of the workpiece is ideally disposed at a position where the center of gravity overlaps the axial center direction of the rotating body. With such a configuration, in the rotation of the rotating body, it is possible to suppress the occurrence of vibration or the occurrence of phase bias.

However, the center of gravity of the actual workpiece often deviates from the axial center direction of the rotating body. Therefore, it is preferable to adjust the imbalance due to the deviation in order to improve the accuracy of machining. For example, a numerical control device has been proposed which calculates the quantity and phase of the imbalance by rotating the workpiece after machining to adjust the balance using a program for balance adjustment (e.g., refer to Japanese Unexamined Patent Application, Publication No.H5-145651).

Patent Document 1: Japanese Unexamined Patent Application, Publication No. H5-145651

SUMMARY OF THE INVENTION

The numerical control device disclosed in Japanese Unexamined Patent Application, Publication No.H5-145651 is advantageous in that it is possible to adjust the workpiece based on the imbalance after machining. In this regard, it is preferable to be able to determine a change in the rotational state of the rotating body so that the balance of the rotating body to which the workpiece is fixed can be adjusted.

A first aspect of the present disclosure relates to a control device is configured to control operation of a drive unit and monitor a rotational balance of a rotating body, for a machine tool including the rotating body that is rotatable around a predetermined axial center in a state of fixing an object and on which an adjusting tool that can adjust the rotational balance is arrangeable, and the drive unit that rotates the rotating body, and the control device includes: a physical quantity acquiring unit configured to acquire at least one physical quantity indicating a rotational state of the rotating body, the physical quantity being changed in response to an adjustment of the rotational balance; a comparing unit configured to compare a plurality of physical quantities having different acquisition times; and an output unit configured to output a comparison result.

A second aspect of the present disclosure relates to a machining system including: a machine tool including a rotating body that is rotatable around a predetermined axial center in a state of fixing an object and on which an adjusting tool that can adjust a rotational balance is arrangeable, and a drive unit that rotates the rotating body; and a control device according to the first aspect.

A third aspect of the present disclosure relates to a recording medium encoded with a program that causes a computer to function as a control device configured to control operation of a drive unit and monitor a rotational balance of a rotating body, for a machine tool including the rotating body that is rotatable around a predetermined axial center in a state of fixing an object and on which an adjusting tool that can adjust the rotational balance is arrangeable, and the drive unit that rotates the rotating body, the program causing the computer to function as: a physical quantity acquiring unit configured to acquire at least one physical quantity indicating a rotational state of the rotating body, the physical quantity being changed in response to an adjustment of the rotational balance; a determining unit configured to compare a plurality of physical quantities having different, acquisition times, and determine a change in a physical quantity; and an output unit configured to output a determination result.

According to the present disclosure, it is possible to provide a control device, a machining system, and a recording medium encoded with a program, which are capable of determining a change in a rotational state of a rotating body.

DETAILED DESCRIPTION OF THE INVENTION

Hereinafter, a description will be given of a control device 1, a machining system 100, and a program according to each embodiment of the present disclosure with reference to FIGS. 1 to 9. First, a description will be given of the rotational balance of a machine tool 2 controlled by the control device 1 and its adjustment, before providing the description of the control device 1, the machining system 100, and the program of the present embodiment.

Figure 1:
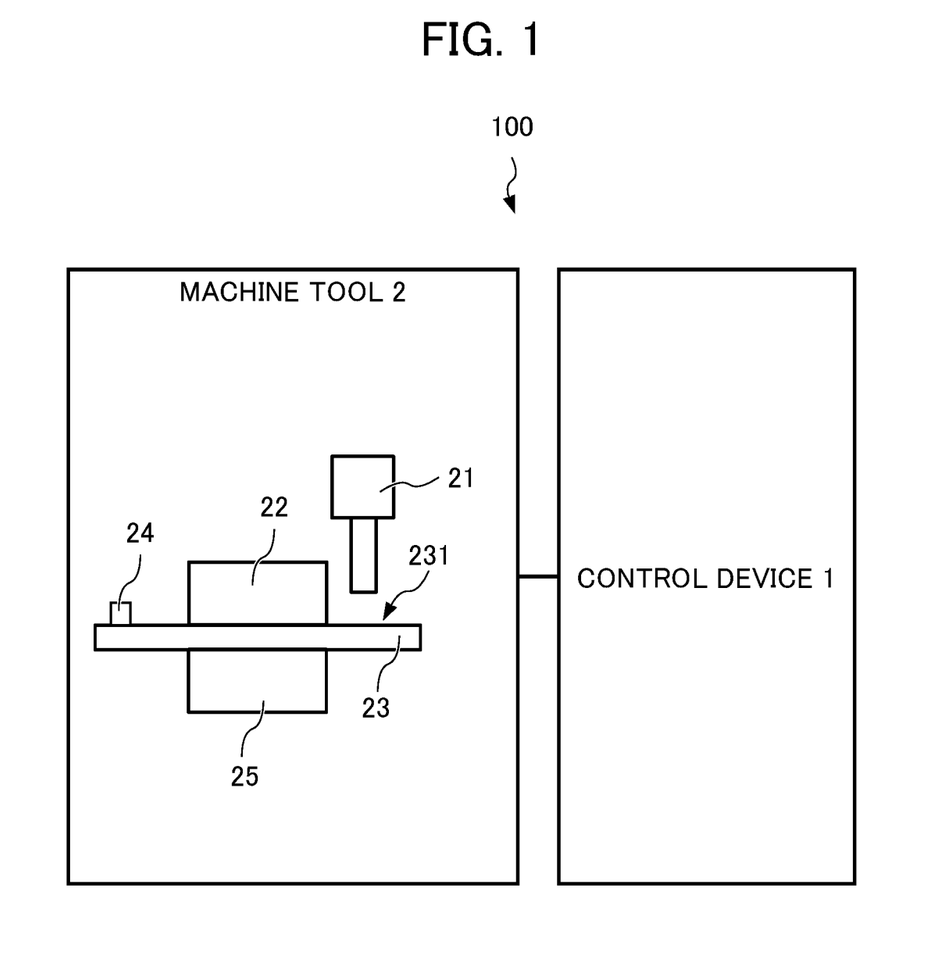
FIG. 1 is a schematic configuration diagram showing a machining system including a control device according to a first embodiment of the present disclosure.
Figure 2:
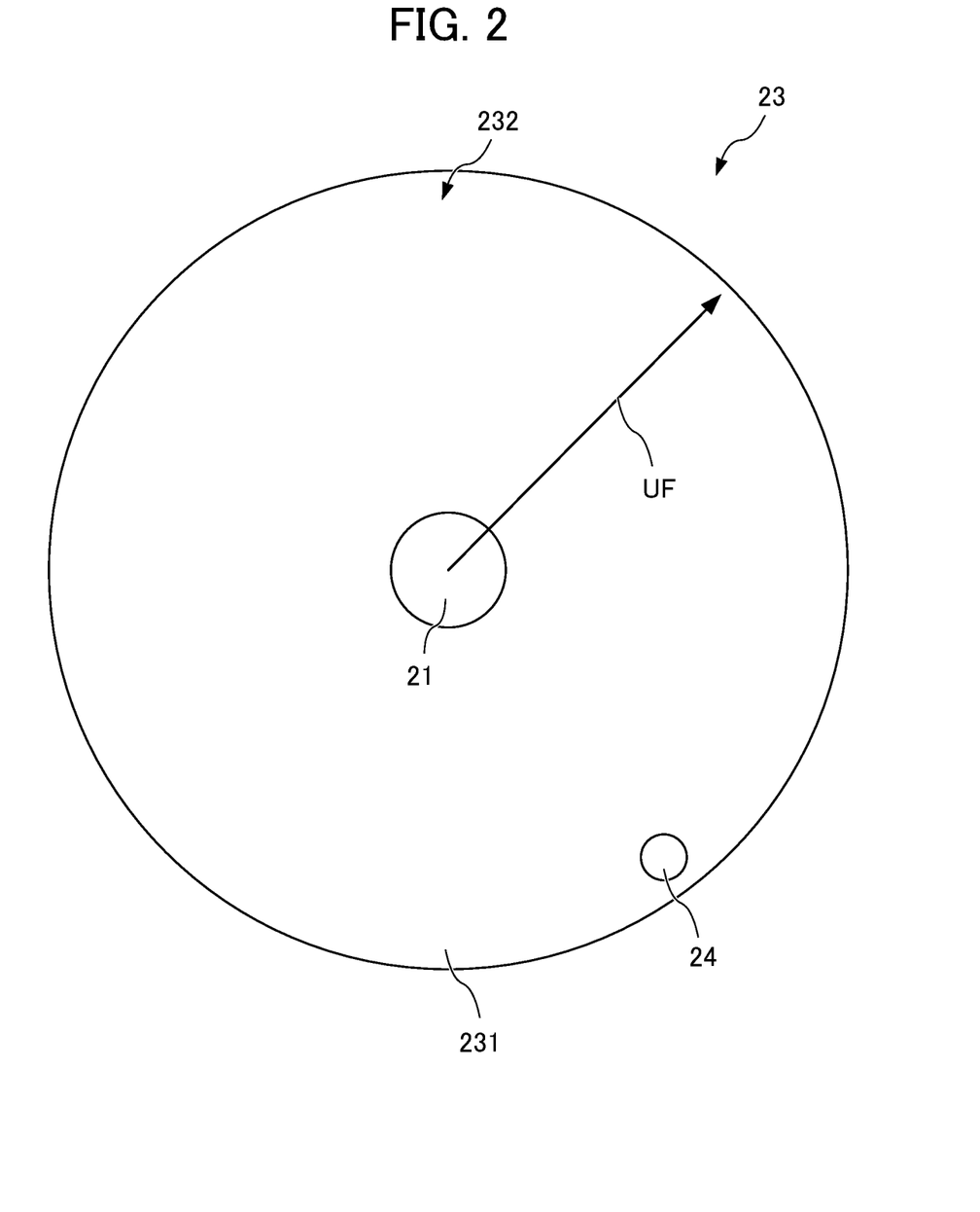
FIG. 2 is a schematic plan view showing a rotating body and a drive unit controlled by the control device of the first embodiment.

The machine tool 2 is, fox example, as shown in FIGS. 1 and 2, a device that can machine, using a tool 21, a workpiece 22 (an example of an "object") that is fixed to a rotating surface 231 (for example, an axial center position) of a rotating body 23. More specifically, the machine tool 2 is configured to be able to machine, using the tool 21, the workpiece 22 that is fixed to rotate to the rotating surface 231 of the rotating body 23. Here, in a case in which the axial center direction of the rotating body 23 does not overlap the center of gravity of the workpiece 22, imbalance in rotation occurs in the rotating body 23. Due to the imbalance in rotation, for example, the occurrence of vibration, phase deviation, or oscillation of the motor current or the like occurs in the rotating body 23.

Such an imbalance in rotation is preferably adjusted for the purpose of improving the machining accuracy of the workpiece 22. The adjustment is performed, for example, by providing an adjusting tool 24 (e.g., a weight) in the arrangement area of the adjusting tool 24 provided on the outer peripheral portion of the rotating surface 231. Furthermore, the adjustment is performed by changing the arrangement position of the adjusting tool 24 provided in the arrangement area. In other words, the adjustment is realized by moving the arrangement of the adjusting tool 24 to a position to cancel the vector UF of the imbalance in rotation as shown in FIG. 2. The control device 1, the machining system 100, and the program according to the following embodiments assist in the arrangement of the adjusting tool 24 by comparing unbalanced vectors that, vary with the arrangement of the adjusting tool 24.

First Embodiment

Next, the control device 1, the machining system 100, and the program of the first embodiment will be described. The machining system 100 is a system for machining the workpiece 22. The machining system 100 includes the machine tool 2 and the control device 1, as shown in FIG. 1.

The machine tool 2 is a device for actually machining the workpiece 22. The machine tool 2 actually machines the workpiece 22 using, for example, the tool 21. The machine tool 2 includes the rotating body 23, a drive unit 25, and the adjusting tool 24.

The rotating body 23 is rotatable around a predetermined axial center in a state of fixing the workpiece 22. The rotating body 23 has, for example, a rotating surface 231 that rotates in a state of fixing the workpiece 22 at the center thereof. Furthermore, the outer peripheral portion of the rotating surface 231 has an arrangement area 232 in which the adjusting tool 24 that can adjust the imbalance in rotation can be provided. The arrangement area 232 is configured to be able to fix the adjusting tool 24 by, for example, mechanical fixation, magnetic force, or an adhesive.

The drive unit 25 is, for example, a motor. The drive unit 25 rotates the rotating body 23. By rotating the rotating body 23 around a predetermined axial center, the drive unit 25 rotates the workpiece 22 and the adjusting tool 24 together with the rotating body 23.

Figure 3:
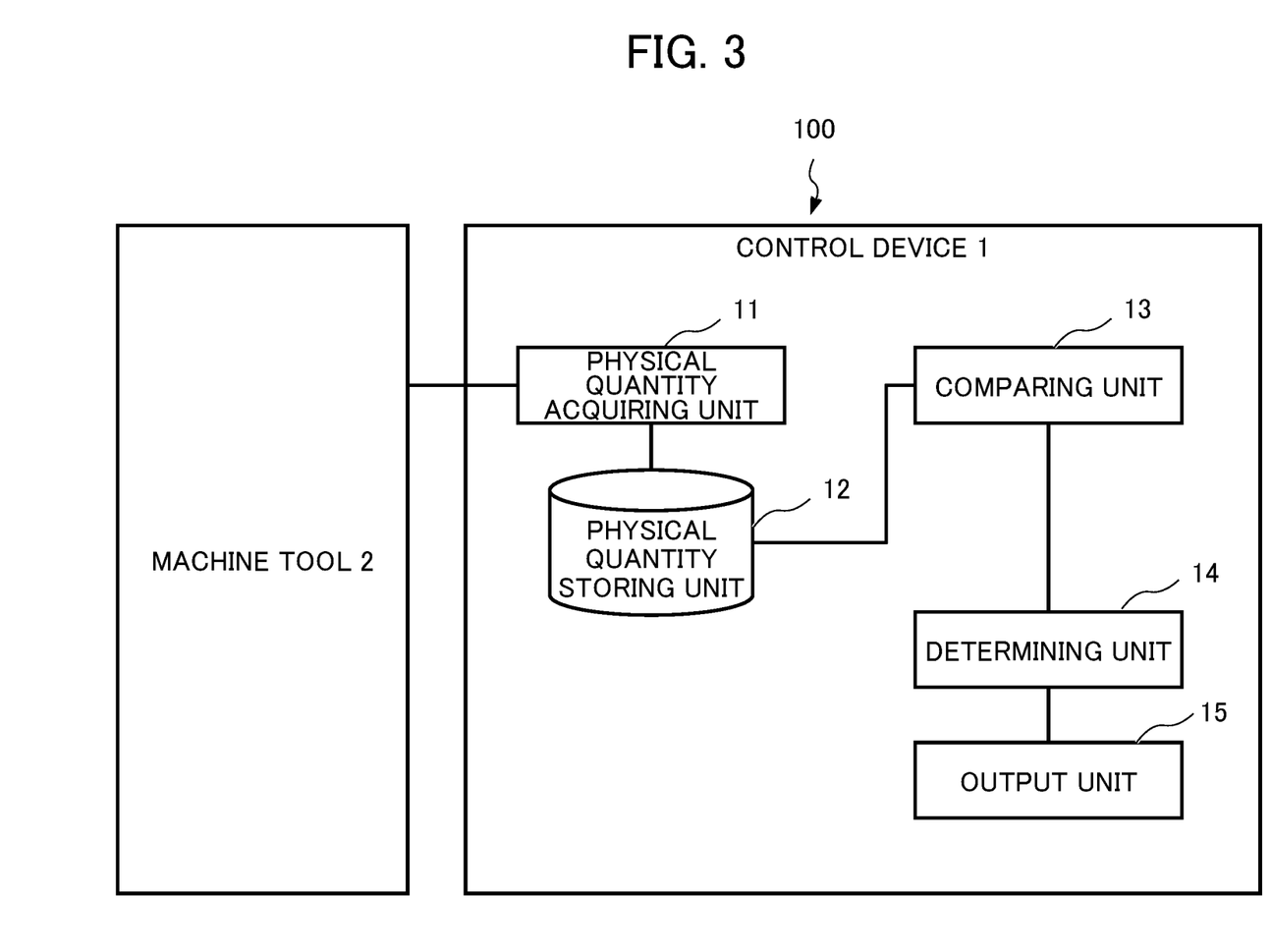
FIG. 3 is a block diagram showing a configuration of the control device according to the first embodiment.

The control device 1 is a device that controls the operation of the tool 21 and the drive unit 25, and can monitor the rotational balance of the rotating body 23. The control device 1 includes a physical quantity acquiring unit 11, a physical quantity storing unit 12, a comparing unit 13, a determining unit 14, and an output unit 15, as shown in FIG. 3.

The physical quantity acquiring unit 11 is realized, for example, by the operation of a CPU. The physical quantity acquiring unit 11 acquires at least one physical quantity which indicates the rotational state of the rotating body 23, and varies in accordance with the adjustment of the rotational balance. The physical quantity acquiring unit 11, for example, acquires a physical quantity from a sensor (not shown) indicating the rotational state of the machine tool 2. The physical quantity acquiring unit. 11 acquires, as a physical quantity, the vibration or the position deviation of the rotating body 23 or the oscillation of an electric current value that operates the drive unit 25. In the present embodiment, the physical quantity acquiring unit 11 acquires the vibration of the rotating body 23.

The physical quantity storing unit 12 is, for example, a storage medium such as memory oi a hard disk. The physical quantity storing unit 12 stores the acquired physical quantities. The physical quantity storing unit 12 stores, for example, a physical quantity acquired every time the adjustment is performed by the adjusting tool 24.

The comparing unit 13 is realized, for example, by the operation of a CPU. The comparing unit 13 compares a plurality of physical quantities having different acquisition times. The comparing unit 13, for example, compares the physical quantities each acquired in a state in which the adjusting tool 24 is provided at a different position. The comparing unit 13 outputs an improvement or a deterioration in the physical quantity as a comparison result. For example, the comparing unit 13 outputs a decrease in vibration, a decrease in the oscillation of a current, or a decrease in phase deviation, or the like as an improvement in the physical quantity. On the other hand, for example, the comparing unit 13 outputs an increase in vibration, an increase in the oscillation of the current, or an increase in phase deviation as a deterioration of the physical quantity. That is, the comparing unit 13 outputs an improvement or a deterioration of the rotational balance as a comparison result.

The determining unit 14 is, for example, realized by the operation of a CPU. The determining unit 14 also determines whether or not the rotational balance should be adjusted based on the change in the physical quantity. The determining unit 14, for example, determines, the adjustment, of the rotational balance leading to the change in which the vibration decreases, as "appropriate". On the other hand, the determining unit 14 determines, the adjustment of the rotational balance leading to the change in which the vibration increases, as "inappropriate".

The output unit 15 is realized, for example, by the operation of a CPU. The output unit 15 outputs a comparison result. The output unit 15 displays the comparison result or a display device (not shown), for example. The output unit 15 displays "an improvement" or "a deterioration" on an output device, for example. Furthermore, the output unit 15 outputs whether or not the rotational balance determined by the determining unit 14 is appropriate.

Figure 4:
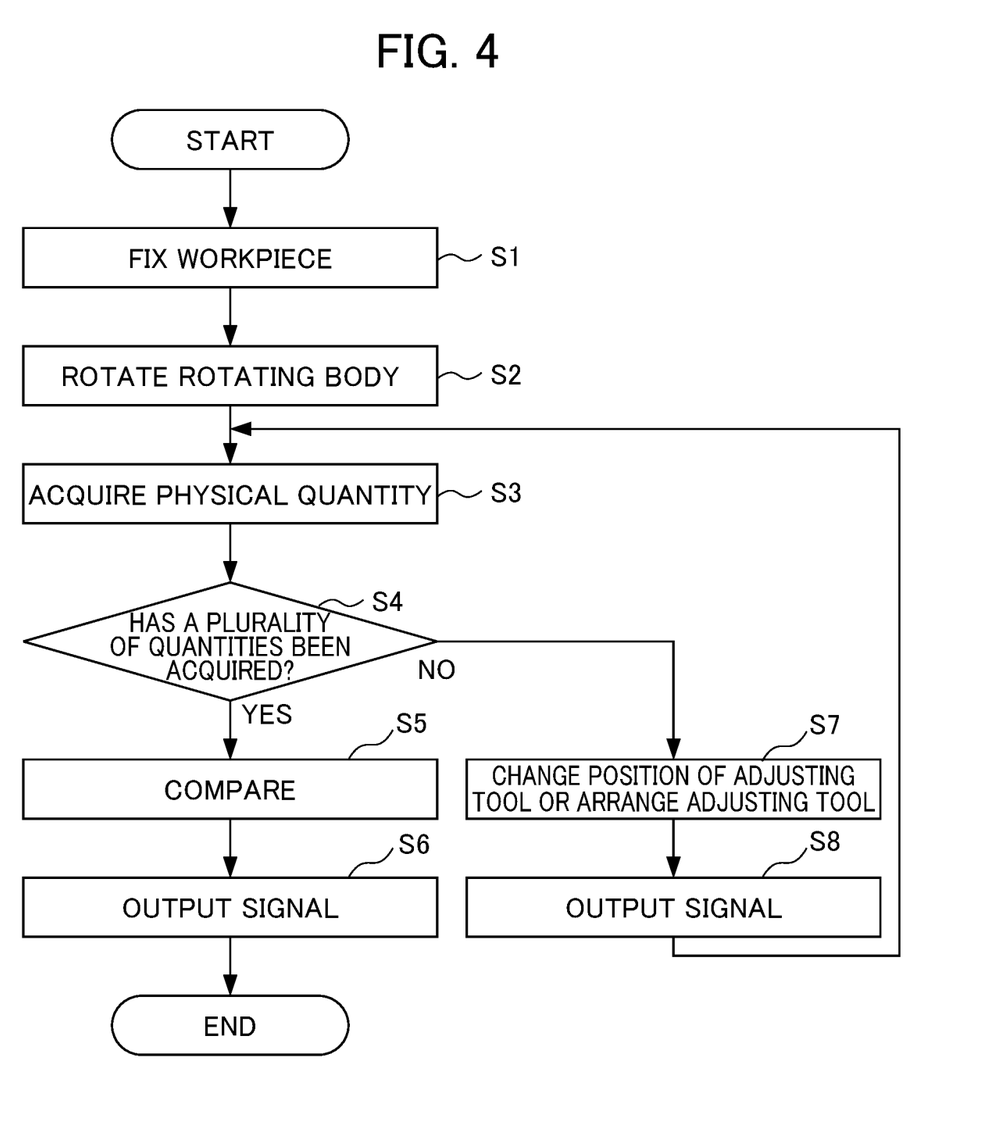
FIG. 4 is a flowchart showing a flow of the operation of the control device of the first embodiment.

Next, the operation of the present embodiment will be described with reference to FIG. 4. First, in Step S1, the workpiece 22 is fixed to the rotating body 23. Next, in Step S2, the rotating body 23 is rotated by the operation of the drive unit 25.

In Step S3, the physical quantity acquiring unit 11 acquires the physical quantity of the rotating body 23. The physical quantity acquiring unit. 11 stores the acquired physical quantity in the physical quantity storing unit 12.

Next, in Step S4, it is determined whether there is a plurality of acquired physical quantities. In a case in which a plurality of physical quantities has been acquired (Step S4: YES), the processing advances to Step S5. On the other hand, in a case in which the first physical quantity is acquired (Step S4: MO), the processing advances to Step S7.

In Step S5, the comparing unit 13 compares a plurality of physical quantities. The comparing unit 13 outputs, for example, as a comparison result, whether the physical quantities are improved or deteriorated. More specifically, the comparing unit 13 compares whether the vibration is reduced or increased.

Next, in Step S6, the output unit 15 outputs a comparison result. The output unit 15, for example, outputs a comparison result to the display device. In the above way, the flow ends.

In Step S7, the output unit 15 outputs the acquired physical quantity. Next, in Step S8, the arrangement or the position of the adjusting tool 24 is changed. As a result, the rotational balance is adjusted. Then, the processing returns to step S3.

Figure 5:
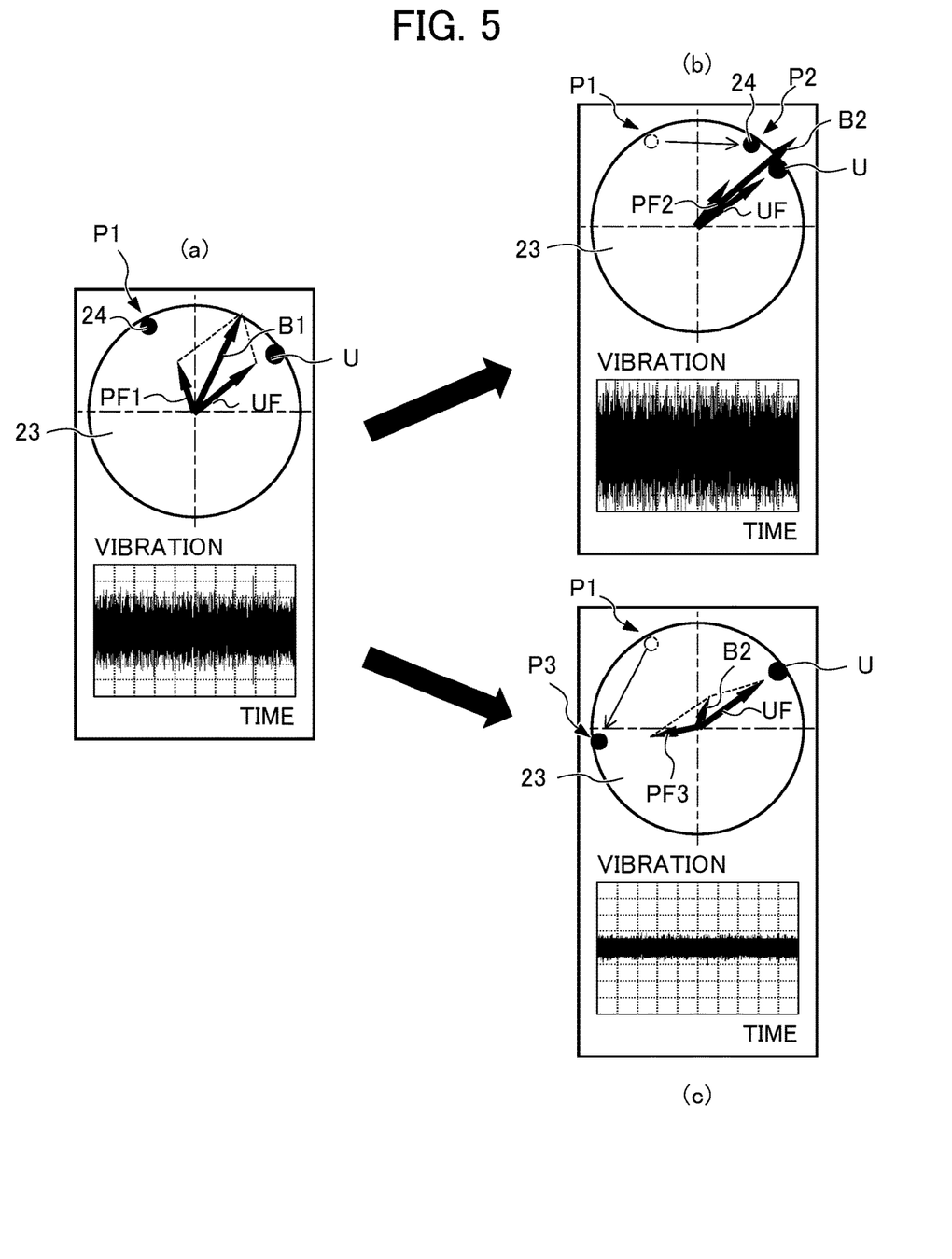
FIG. 5 is a conceptual diagram showing a relationship between the rotating body controlled by the control device of the first embodiment and the arrangement of an adjustor.

Next, examples of the control device 1, the machining system 100, and the program of the present embodiment will be described. As shown in FIG. 5(a), in a case in which the adjusting tool 24 is provided at a predetermined position P1 of the rotating body 23, a synthesized vector 31 is generated based on the vector UF of the imbalance U by the workpiece 22 and the vector PF1 by the adjusting tool 24. Furthermore, as shown in FIG. 5(b), in a case in which the position of the adjusting tool 24 is changed to the next position P2, the vector PF1 by the adjusting tool 24 is changed to the vector PF2. As a result, the synthesized vector B1 is also changed to the synthesized vector B2. In this change, the synthesized vector 32 becomes larger than the vector UF of the imbalance U. Thus, it can be found that this change is a change that moves the adjusting tool 24 in an inappropriate direction (in a direction approaching the vector UF of the imbalance U).

As shown in FIG. 5(c), in a case in which the position of the adjusting tool 24 is changed to the next position P3, the vector PF1 by the adjusting tool 24 is changed to the vector PF3. As a result, the synthesized vector B1 is changed to the synthesized vector B3. In this change, the synthesized vector B3 becomes smaller than the vector UF of the imbalance U. Thus, it can be found that this change is a change that moves the adjusting tool 24 in an appropriate direction (in a direction away from the vector UF of the imbalance U). That is, by repeating the movement of the adjusting tool 24 in an appropriate direction, it is possible to make the adjusting tool 24 close to a position in an appropriate rotational balance.

Next, a program according to the present disclosure will be described. Each configuration included in the control device 1 can be realized by hardware, software, or a combination thereof. Here, being realized by software means being realized by a computer reading and executing a program.

The program can be stored on any of various types of non-transitory computer readable media and be provided to a computer. The non-transitory computer readable media include various types of tangible storage media. Examples of non-transient computer-readable media include magnetic recording media (e.g., flexible disks, magnetic tapes, hard disk drives), magnetic-optical recording media (e.g., magnetic optical disks), CD-ROM(Read Only Memory), CD-R, CD-R/W, solid-state memories (e.g., mask ROM, PROM (Programmable ROM), EPROM(Erasable PROM, flash ROM, RAM (random access memory)). Furthermore, a display program nay be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, optical fiber, or the like, or a wireless communication path.

As described above, the control device 1, the machining system 100, and the program according to the first embodiment have the following effects.

(1) A control device 1 configured to control operation of a drive unit 25 and monitor a rotational balance of a rotating body 23, for a machine tool 2 including the rotating body 23 that is rotatable around a predetermined axial center in a state of fixing a workpiece 22 and on which an adjusting tool 24 that can adjust the rotational balance is arrangeable, and the drive unit 25 that rotates the rotating body 23, includes: a physical quantity acquiring unit 11 configured to acquire at least one physical quantity indicating a rotational state of the rotating body 23, the physical quantity being changed in response to an adjustment of the rotational balance; a comparing unit 13 configured to compare a plurality of physical quantities having different acquisition times; and an output unit 15 configured to output a comparison result. Furthermore, a machining system 100 includes: a machine tool 2 including a rotating body 23 that is rotatable around a predetermined axial center in a state of fixing a workpiece 22 and on which an adjusting tool 24 that can adjust a rotational balance is arrangeable, and a drive unit 25 that rotates the rotating body 23; and the above control device 1. Furthermore, a recording medium encoded with a program that causes a computer to function as a control device 1 configured to control operation of a drive unit 25 and monitor a rotational balance of a rotating body 23, for a machine tool 2 including the rotating body 23 that is rotatable around a predetermined axial center in a state of fixing a workpiece 22 and on which an adjusting tool 24 that can adjust the rotational balance is arrangeable, and the drive unit 25 that rotates the rotating body 23, the program causing the computer to function as: a physical quantity acquiring unit 11 configured to acquire at least one physical quantity indicating a rotational state of the rotating body 23, the physical quantity being changed in response to an adjustment of the rotational balance; a determining unit 14 configured to compare a plurality of physical quantities having different acquisition times, and determine a change in a physical quantity; and an output unit 15 configured to output a determination result. As a result, a change in the rotational state of the rotating body 23 is outputted as a comparison result. Therefore, it is possible to determine a change in the rotational state of the rotating body 23. In other words, it is possible to easily determine the change in the physical quantity due to the adjustment of the rotational balance. In particular, depending on the shape of the workpiece 22, the balance may change as the machining progresses. The balance may be changed due to, for example, asymmetrical machining with respect to the rotational axis (irregularities, drilling, etc.), positional deviation due to centrifugal force that varies with an increase of the rotational speed, etc., and positional deviation caused by the cutting reaction force during machining. This control is particularly effective when the machine tool to be controlled is an ultra-precise processing machine whose command unit of position control is 10 nm (nanometer) or less. In ultra-precise machining on the order of nanometers, it is effective to carry out balance adjustment frequently. High-precision machining can be maintained by frequently carrying out the balance adjustment.

(2) Furthermore, the control device 1 further includes a determining unit 14 configured to determine whether the adjustment of the rotational balance is appropriate based on a change in the physical quantity, and the output unit 15 outputs a determination result. As a result, it is possible to easily recognize whether or not the result of adjustment of the rotational balance is appropriate.

Second Embodiment

Next, a control device 1, a machining system 100, and a program according to a second embodiment of the present disclosure will be described with reference to FIGS. 6 and 7. In the description of the second embodiment, the same components as those of the above-described embodiment are denoted by the same reference numerals, and descriptions thereof are omitted or simplified. The control device 1, the machining system 100, and the program according to the second embodiment are different from those of the first embodiment in that, in addition to the first embodiment, it can be further determined whether or not the rotational balance of the rotating body 23 indicated by the acquired physical quantity is appropriate for machining.

Figure 6:
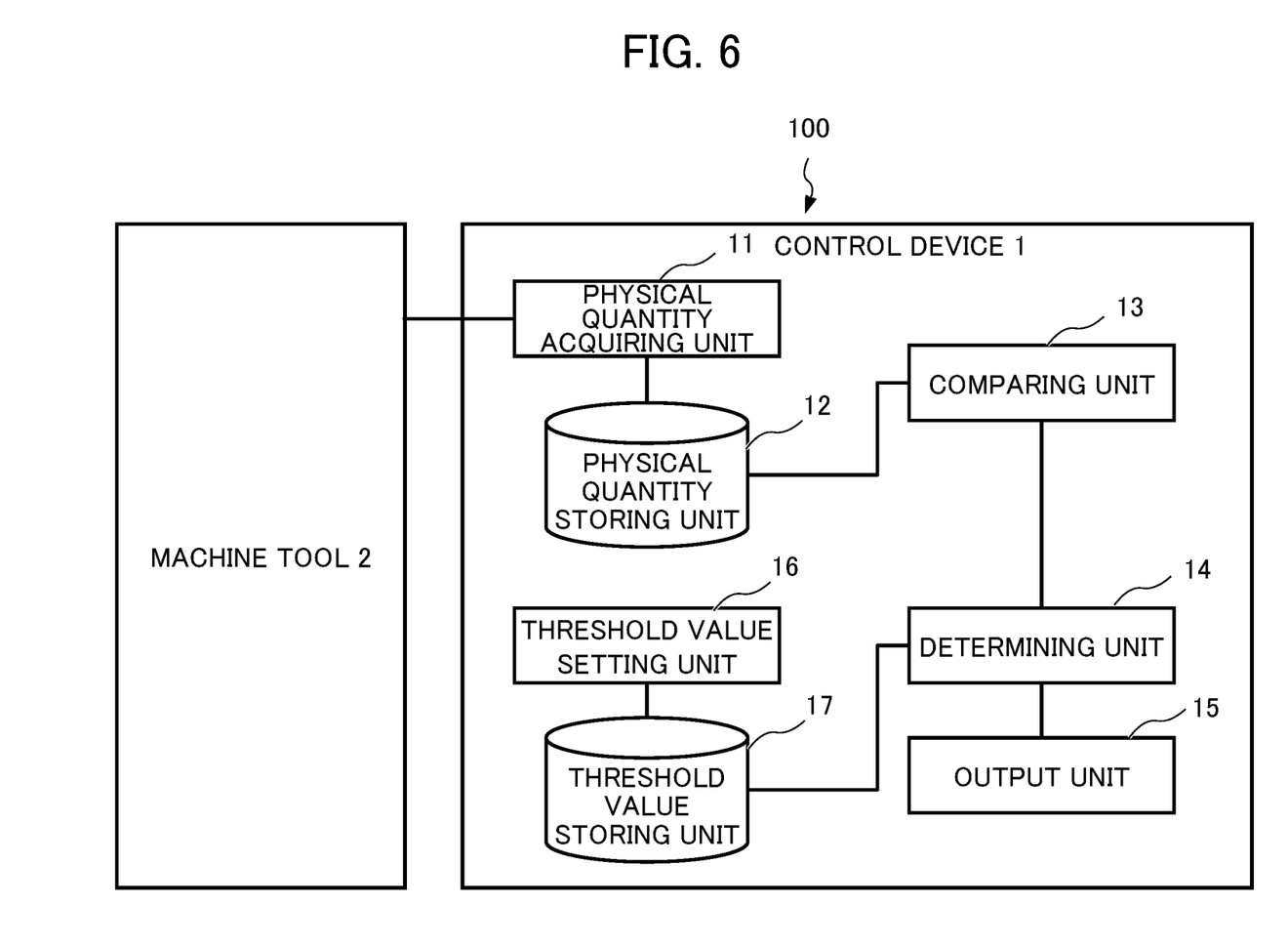
FIG. 6 is a block diagram showing a configuration of a control device according to a second embodiment of the present disclosure.
Figure 7:
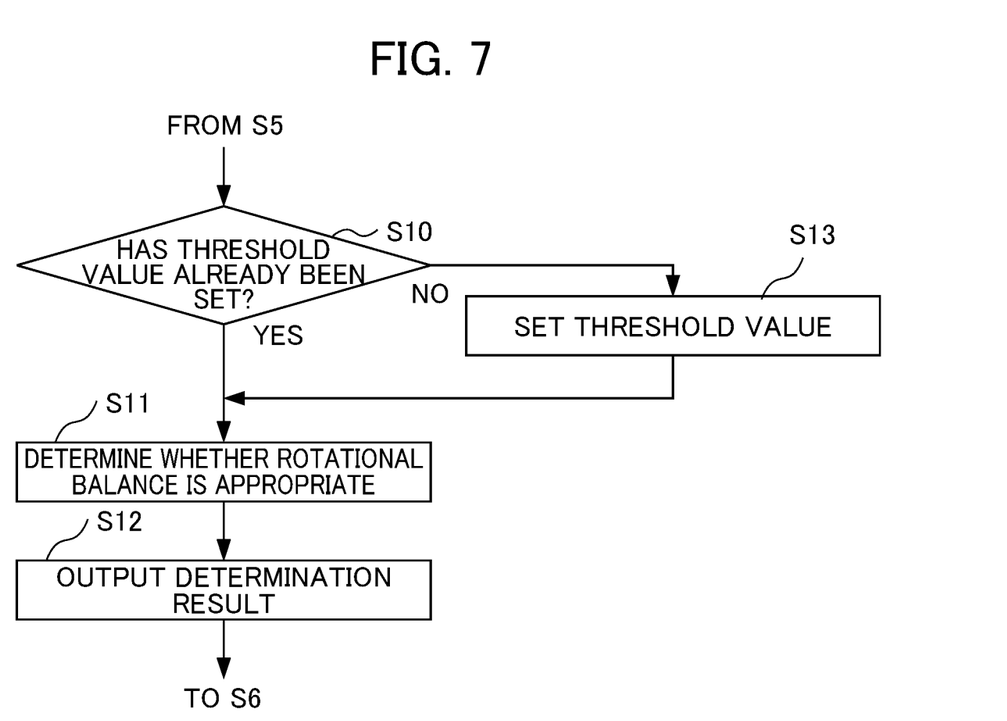
FIG. 7 is a flowchart showing a flow of operations of the control device according to the second embodiment.

The control device 1 according to the second embodiment differs from that of the first embodiment in that, as shown in FIG. 6, the control device 1 further includes a threshold value setting unit 16 for setting a threshold value at which possible to determine to be an appropriate rotational balance. Furthermore, the control device 1 according to the second embodiment is different from that of the first embodiment in that the control device 1 further includes a threshold value storing unit 17 for storing a threshold value that is set. Furthermore, the control device 1 according to the second embodiment is different from that of the first embodiment in that the determining unit 14 determines whether or not the rotational balance indicated by the physical quantity acquired based on the set threshold value is appropriate. Furthermore, the control device 1 according to the second embodiment is different from the first embodiment, in that the output unit 15 outputs whether the determined rotational balance is appropriate.

The threshold value setting unit. 16 is, for example, realized by the operation of a CPU. The threshold value setting unit 16 sets a threshold value of a physical quantity that can be determined to be appropriate. The threshold value setting unit 16, for example, sets a threshold value of the magnitude of vibration to determine the rotational balance as appropriate.

The threshold value storing unit 17 is, for example, a secondary recording medium such as a hard disk. The threshold value storing unit 17 stores a threshold value that has been set.

Next, the operation of the control device 1, the machining system 100, and the program according to the present embodiment will be described with reference to the flowchart of FIG. 7. The operation of the control device 1, the machining system 100, and the program of the second embodiment is performed following Step S5 of the first embodiment.

In Step S10, it is determined whether a threshold value has been set. In a case in which the threshold value has been set (Step S10: YES), the processing advances to Step S11. On the other hand, in a case in which a threshold value has not been set (Step S10: NO), the processing advances to Step S13.

In Step S11, the determining unit 14 determines whether the rotational balance indicated by the acquired physical quantity is appropriate. For example, the determining unit 14 determines whether the rotational balance with respect to the acquired latest physical quantity is appropriate.

Next, in Step S12, the output unit 15 outputs a determination result by the determining unit 14. The output unit 15, for example, outputs whether the rotational balance is appropriate to the display device. As a result, the processing of the present flow returns to Step S6.

In Step S13, the threshold value setting unit 16 sets a threshold value. The threshold value setting unit 16 sets, for example, a value inputted to an input unit (not shown) as a threshold value. The threshold value setting unit 16 sets, for example, a maximum value of the magnitude for vibration of the rotating body 23 suitable for machining the workpiece 22 as a threshold value. The threshold value setting unit 16 stores the set threshold value in the threshold value storing unit 17. Thereafter, the processing advances to Step S11.

As described above, the control device 1, the machining system 100, and the program according to the second embodiment have the following effects.

(3) The control device 1 further includes a threshold value setting unit 16 configured to set a threshold value of a physical quantity at which possible to determine as an appropriate rotational balance, in which the determining unit 14 determines whether the rotational balance indicated by a physical quantity acquired based on a threshold value that is set is appropriate, and in which the output unit 15 outputs whether the rotational balance that is determined is appropriate. As a result, it is possible to output whether or not the adjustment of the rotational balance acquired by changing the arrangement or the position of the adjusting tool 24 is suitable for machining. Therefore, it is possible to easily determine whether the adjustment result is appropriate.

Third Embodiment

Figure 8:
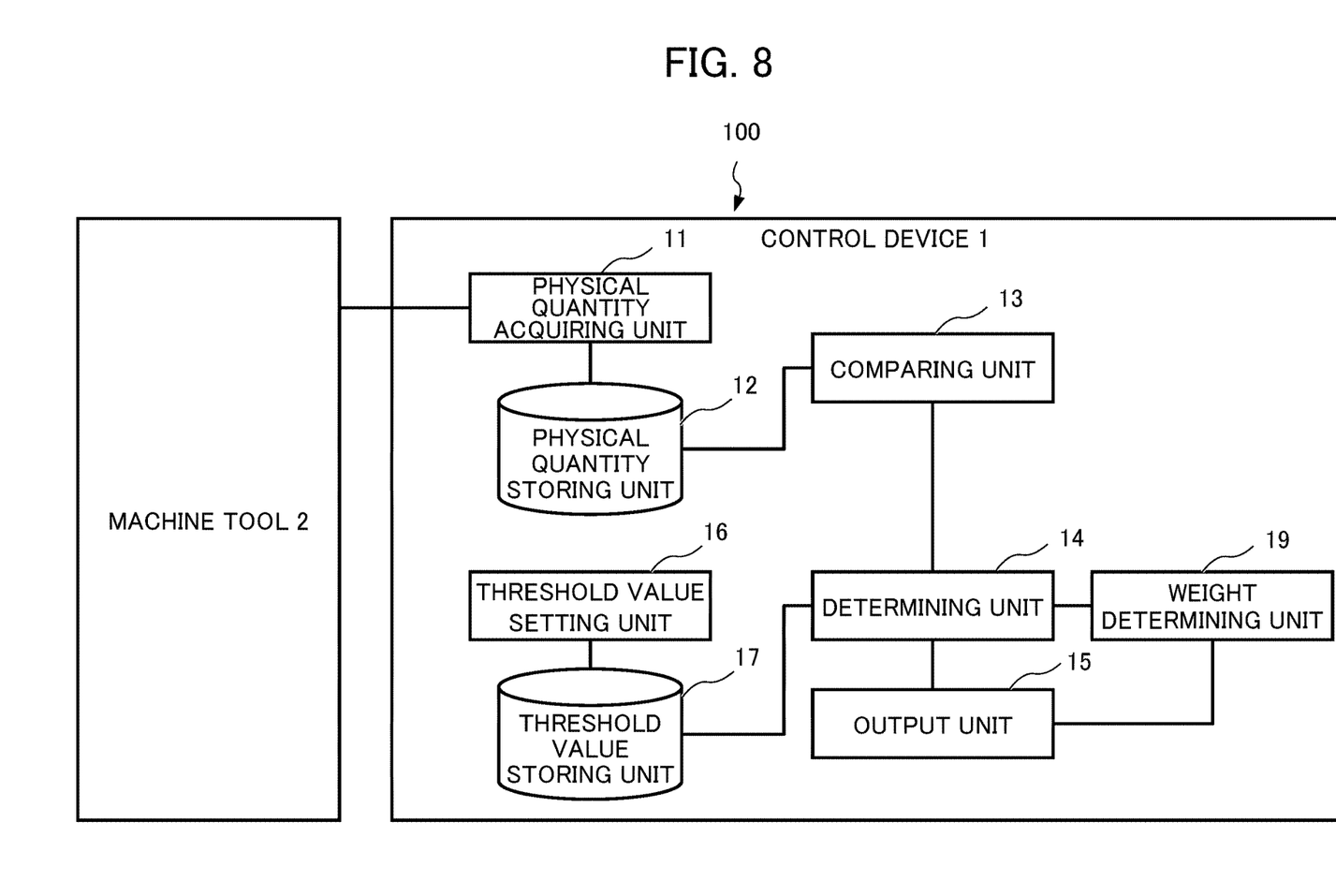
FIG. 8 is a block diagram showing a configuration of the control device according to the second embodiment of the present disclosure.
Figure 9:
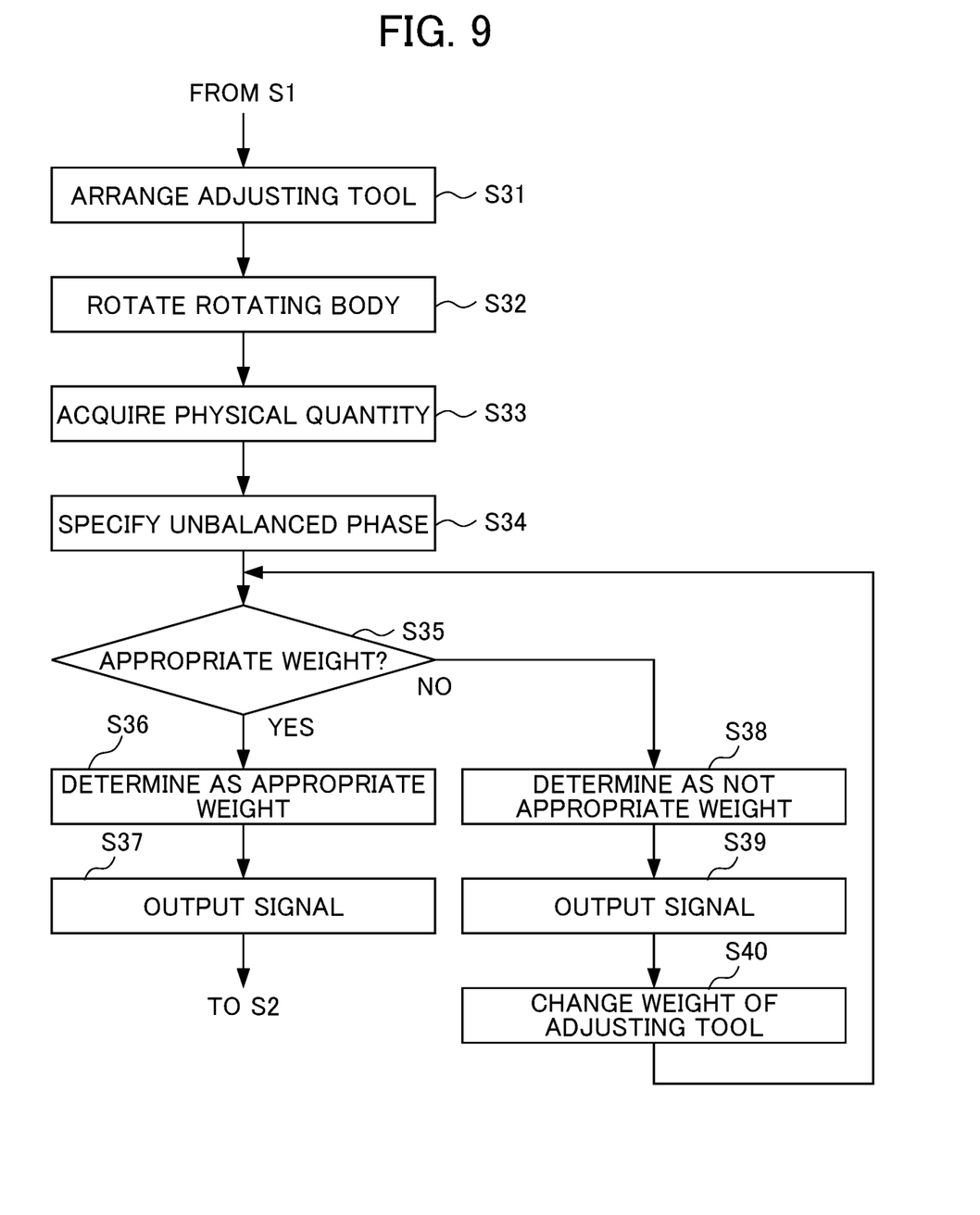
FIG. 9 is a flowchart showing a flow of operations of a control device according to a third embodiment.

Next, a control device 1, a machining system 100, and a program according to a third embodiment of the present disclosure will be described with reference to FIGS. 8 and 9. In the description of the third embodiment, the same components as those of the above-described embodiment are denoted by the same reference numerals, and descriptions thereof are omitted or simplified. The control device 1, the machining system 100, and the program according to the third embodiment determine the weight of the adjusting tool 24 to be provided. That is, the control device 1, the machining system 100, and the program according to the third embodiment are intended to determine the weight so as not to exceed the physical quantity that can be outputted (displayed) by the output unit 15 by setting the adjusting tool 24 to the weight to suppress the magnitude of vibration of the rotating body 23 to a predetermined magnitude or less. The operation of the control device 1, the machining system 100, and the program according to the third embodiment is performed immediately after the arrangement of the workpiece 22 of the first and second embodiments.

The control device 1, the machining system 100, and the program according to the third embodiment are different from those of the first and second embodiments in that the machining system 100, and the program according to the third embodiment further include a weight determining unit 19 for determining the weight of the adjusting tool 24 as shown in FIG. 6. Furthermore, the control device 1, the machining system 100, and the program according to the third embodiment are different from those of the first and second embodiments in that the determining unit 14 specifies an unbalanced phase caused by the arrangement of the adjusting tool 24 having a predetermined weight. Furthermore, the control device 1, the machining system 100, and the program according to the third embodiment are different from those of the first and second embodiments in that the determining unit 14 specifies the unbalanced phase based on the change in the physical quantity acquired based on the change in the arrangement of the adjusting tool 24 and the change in the drive of the drive unit 25. Furthermore, the control device 1, the machining system 100, and the program according to the third embodiment are different from those of the first and second embodiments in that the weight determining unit 19 determines the weight of the adjusting tool 24 so that the magnitude of vibration of the rotating body 23 in the specified phase is equal to or less than a predetermined value.

The weight determining unit 19 is realized, for example, by the operation of a CPU. The weight determining unit 19 determines, for example, the weight of the adjusting tool 24 so that the magnitude of vibration of the rotating body 23 in the specified phase is equal to or less than a predetermined value. More specifically, the weight, determining unit. 19 determines the weight of the adjusting tool 24 in the specified unbalanced phase by the arrangement to the rotating body 23 of the adjusting tool 24 having a different weight.

Next, the operation of the control device 1, the machining system 100, and the program according to the present embodiment will be described with reference to the flowchart of FIG. 9. The present flow is performed following Step S1 in the flow of the first embodiment. First, in Step S31, the adjusting tool 24 having a predetermined weight is disposed on the rotating body 23. Next, in Step S32, the rotating body 23 is rotated. Next, in Step S33, the physical quantity acquiring unit 11 acquires the physical quantity of the rotational state of the rotating body 23. Next, in Step S34, the determining unit 14 specifies an unbalanced phase.

Next, in Step S35, the weight determining unit 19 determines whether or not the weight of the adjusting tool 24 is appropriate. That is, the weight determining unit 19 determines whether the vibration of the acquired physical quantity becomes a minimum value. The weight determining unit 19 determines the weight of the adjusting tool 24 which makes the vibration of the physical quantity to become a minimum value as appropriate. This weight is found by, for example, a plurality of the actual arrangements of adjusting tools 24 having different weights. In a case in which the vibration becomes a minimum value (Step S35: YES), the processing advances to Step S36. On the other hand, in a case in which the vibration does not become the minimum value (Step S35: NO), the processing advances to Step S38.

In Step S36, the weight determining unit 19 determines the adjusting tool 24 that has been disposed as the adjusting tool 24 having an appropriate weight. Next, in Step S37, the output unit 15 outputs a signal indicating that the weight of the adjusting tool 24 is appropriate. Next, the processing advances to Step S2.

In Step S38, the weight determining unit 19 determines the adjusting tool 24 as not the adjusting tool 24 having an appropriate weight. Next, in Step S39, the output unit 15 outputs a signal indicating that the weight of the adjusting tool 24 is not appropriate. Next, in Step S40, the adjusting tool 24 having a changed weight is disposed on the rotating body 23. For example, in a case in which it is found that the oscillation of the physical quantity is increased by increasing the weight of the adjusting tool 24, the adjusting tool 24 having a lighter weight is newly disposed on the rotating body 23. On the contrary, in a case in which it is found that the vibration of the physical quantity is increased by decreasing the weight of the adjusting tool 24, the adjusting tool 24 having a heavier weight is newly disposed on the rotating body 23. Next, the processing returns to Step S3S.

As described above, the control device 1, the machining system 100, and the program according to the third embodiment have the following effects.

(4) The control device 1 further includes a weight determining unit 19 configured to determine weight of the adjusting tool 24, in which the determining unit 14 specifies an unbalanced phase occurred by an arrangement of the adjusting tool 24 having a predetermined weight, and in which the weight determining unit 19 determines the weight of the adjusting tool 24 so that a magnitude of vibration of the rotating body 23 in a specified phase is set to be equal to or less than a predetermined value. With such a configuration, it is possible to limit the vibration of the rotating body 23 to a magnitude that can be visually recognized by a display device. Therefore, since the magnitude of the displayed vibration does not exceed a display limit, the rotational balance can be appropriately displayed.

(5) The determining unit 14 specifies an unbalanced phase based on a change in a physical quantity acquired based on a change in the arrangement of the adjusting tool 24 and a change in drive by the drive unit 25, and the weight determining unit 19 determines the weight of the adjusting tool 24 in a specified unbalanced phase, by the adjusting tool 24 having a different weight being arranged on the rotating body 23. With such a configuration, by adjusting the weight of the adjusting tool 24, it is possible to adjust the rotational balance using the adjusting tool 24 having an appropriate weight.

Although preferred embodiments of the control device, the machining system, and the program of the present disclosure have been described above, the present disclosure is not limited to the above-described embodiments, and can be modified as appropriate. For example, in the above embodiments, the control device 1 may further include a change control unit configured to change the arrangement of the adjusting tool 24 according to the specified unbalanced phase by the determining unit 14. In other words, the control device 1 may allow a robot (not shown) that changes the arrangement of the adjusting tool 24 to include a change control unit that changes the position of the adjusting tool 24.

Furthermore, in the above embodiments, the output unit 15 displayed on the display device has been described as an example; however, the present invention is not limited thereto. The output unit IS may output a signal using sound, light, vibration, or the like.

Furthermore, in the above embodiments, the descriptions have been made by taking as an example a rotating body which is rotatable around a predetermined axial center in a state in which a workpiece is fixed, and can adjust the rotational balance; however, the present invention is not limited thereto. The adjusting tool may be disposed in a rotating body which is rotatable around a predetermined axial center in a state of fixing a tool. That is, the adjusting tool may be disposed on a rotating body to which an object including a workpiece or a tool is fixed.

It should be noted that, in a case in which the support structure of a spindle is a hydrodynamic bearing (an air bearing, an oil bearing, etc.) and a bearing having a support structure without metallic contact accompanied by lubricating oil such as a magnetic bearing, the support rigidity is relatively low. Therefore, even if the imbalance is very small, a shake and a swing corresponding to the size of the imbalance are generated. Therefore, the above control is particularly effective for imbalances which change gradually by machining in the support structure of such a spindle.

EXPLANATION OF REFERENCE NUMERALS 1 control device
2 machine tool
11 physical quantity acquiring unit
13 comparing unit
14 determining unit
15 output unit
16 threshold value setting unit
19 weight determining unit
22 workpiece (object)
23 rotating body
24 adjusting tool
25 drive unit
100 machining system

What is claimed is:

1. A machining system comprising:
a machine tool including a rotating body that is rotatable around a predetermined axial center on which an adjusting tool that can adjust a rotational balance is arrangeable, and including a drive unit that rotates the rotating body, wherein a workpiece is fixed to the rotating body; and
a control device configured to control operation of the drive unit and monitor a rotational balance of the rotating body, the control device comprising:
a physical quantity acquiring unit configured to acquire at least one physical quantity indicating a rotational state of the rotating body including the workpiece, the physical quantity being changed in response to an adjustment of the rotational balance;
a comparing unit configured to compare a plurality of physical quantities having different acquisition times; and
an output unit configured to output a comparison result.

2. The machining system according to claim 1, wherein the control device further comprises a determining unit configured to determine whether the adjustment of the rotational balance is appropriate based on a change in the physical quantity,
wherein the output unit outputs a determination result.

3. The machining system according to claim 2, wherein the control device further comprises a threshold value setting unit configured to set a threshold value of the physical quantity at which possible to determine as an appropriate rotational balance,
wherein the determining unit determines whether the rotational balance indicated by the physical quantity acquired based on the threshold value that is set is appropriate, and
wherein the output unit outputs whether the rotational balance that is determined is appropriate.

4. The machining system according to claim 2, wherein the control device further comprises a weight determining unit configured to determine weight of the adjusting tool,
wherein the determining unit specifies an unbalanced phase occurred by an arrangement of the adjusting tool having a predetermined weight, and
wherein the weight determining unit determines the weight of the adjusting tool so that a magnitude of vibration of the rotating body in the specified phase is set to be equal to or less than a predetermined value.

5. The machining system according to claim 4,
wherein the determining unit specifies an unbalanced phase based on a change in the physical quantity acquired based on a change in the arrangement of the adjusting tool and a change in drive by the drive unit,
wherein the weight determining unit determines the weight of the adjusting tool in the specified unbalanced phase, by the adjusting tool having a different weight being arranged on the rotating body.

6. The machining system according to claim 4, wherein the control device further comprises a change control unit configured to change the arrangement of the adjusting tool according to the specified unbalanced phase.

7. The machining system according to claim 1, wherein the adjusting tool and the workpiece are directly placed on a same rotating surface of the rotating body.

* * * * *